April 26, 1927.
E. A. SPERRY
GYROCOMPASS RELAY TRANSMITTER
Filed March 12, 1920  3 Sheets-Sheet 1
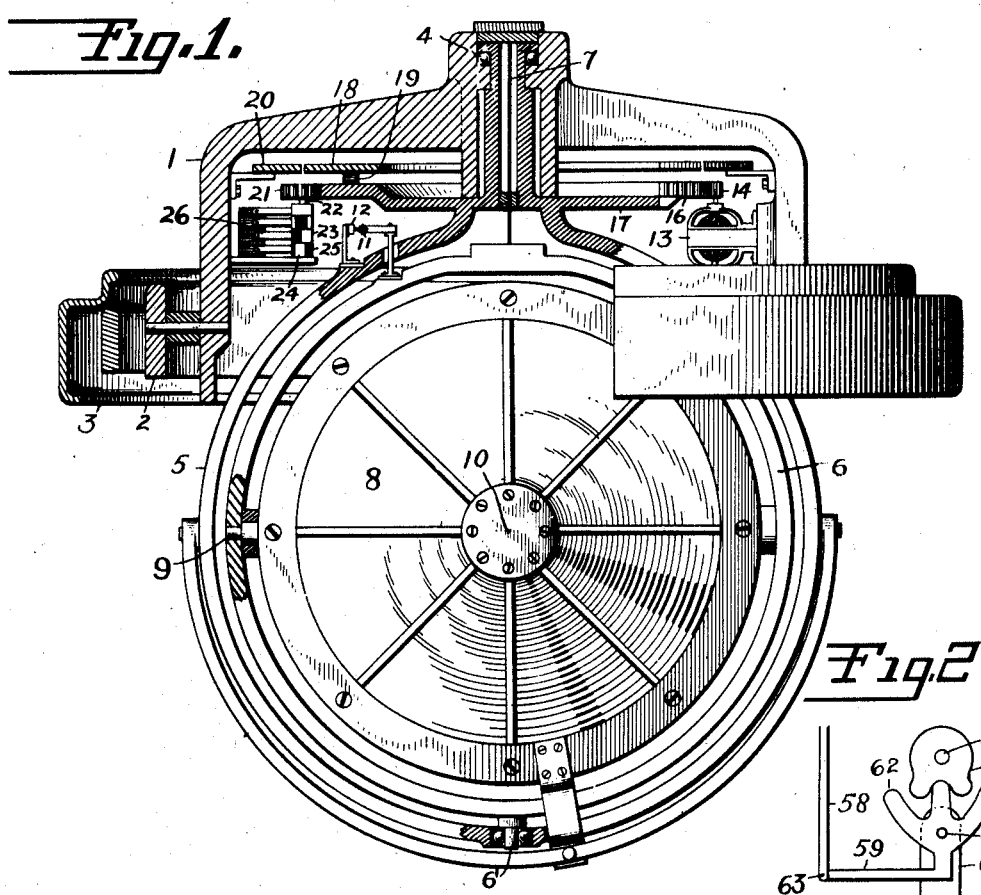
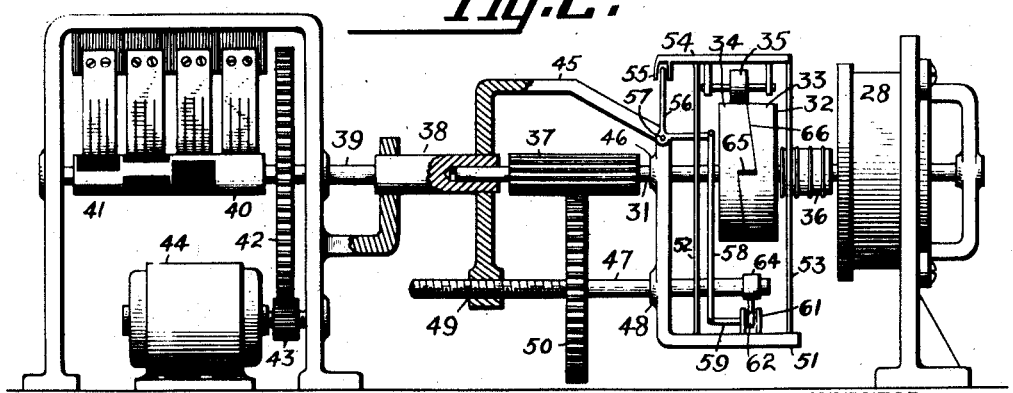
INVENTOR
ELMER A. SPERRY.
BY
Herbert H. Thompson
HIS ATTORNEY.

April 26, 1927.
E. A. SPERRY
1,626,123
GYROCOMPASS RELAY TRANSMITTER
Filed March 12, 1920   3 Sheets-Sheet 2
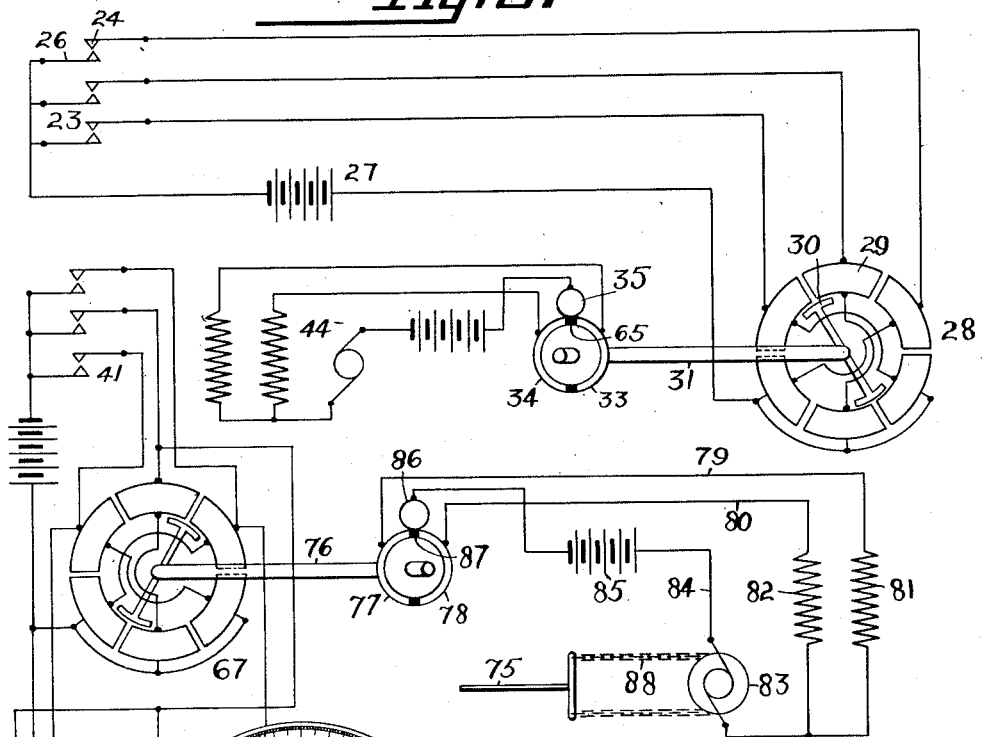
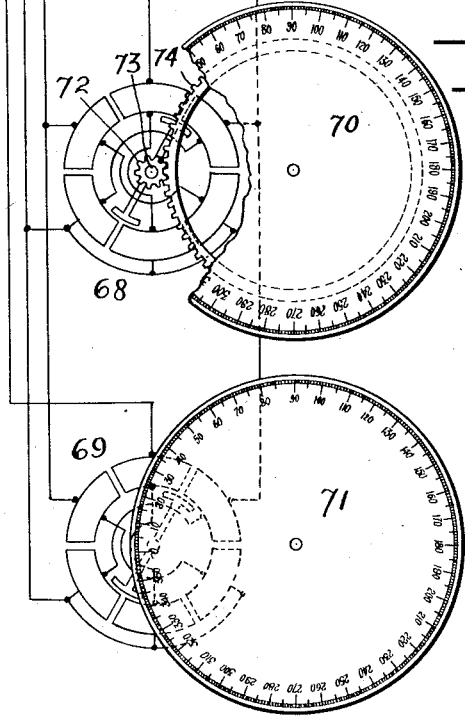
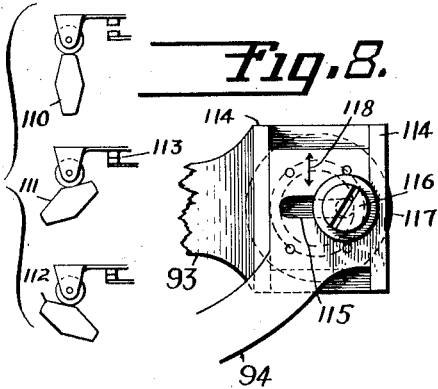
INVENTOR
ELMER A. SPERRY.
BY
Herbert H. Thompson
HIS ATTORNEY.

April 26, 1927.  
E. A. SPERRY  
1,626,123  
GYROCOMPASS RELAY TRANSMITTER  
Filed March 12, 1920  3 Sheets-Sheet 3
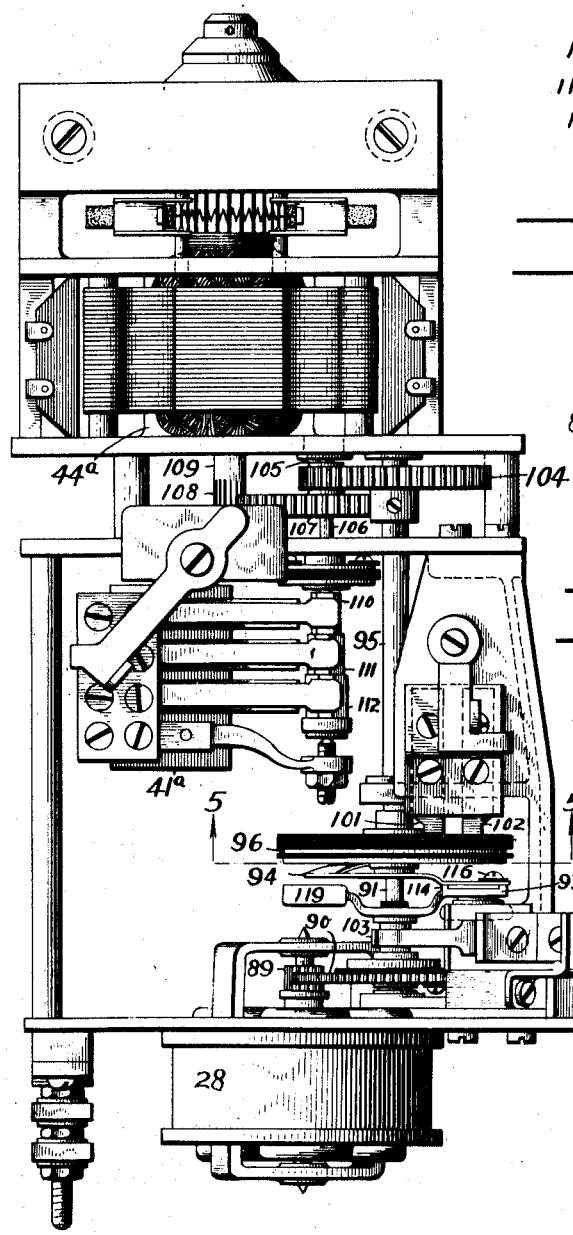
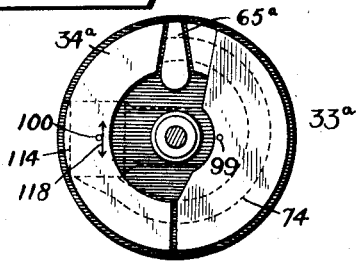
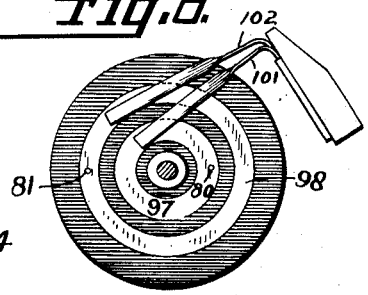
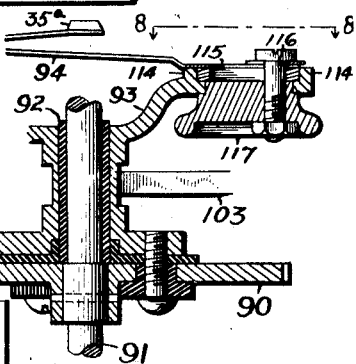
INVENTOR  
ELMER A. SPERRY  
BY  
Herbert H. Thompson  
HIS ATTORNEY.

Patented Apr. 26, 1927.

1,626,123

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

GYROCOMPASS RELAY TRANSMITTER.

Application filed March 12, 1920. Serial No. 365,145.

This invention relates to relay transmitters for effecting the repetition of the movements of an instrument such as a gyroscopic compass or other master or control instrument in the repeater instruments, such as repeater compasses, gunfire control, and other instruments which are usually positioned at considerable distances from the controlling instrument.

This application is a continuation in part of my copending application Serial No. 871,885 for navigational apparatus, filed November 13, 1914, which has now matured into Letters Patent No. 1,360,694 dated November 30, 1920.

As is well known, it is the usual custom in master gyro compasses to cause the sensitive element to control the position of the compass card through a reversing motor and to cause a constant relative movement back and forth to take place between the compass card and the lubber ring to keep the suspension bearing of the sensitive element always free from static friction so that it will yield to the slightest tendency of the sensitive element to turn by reason of the directive force exerted by the gyroscope or gyroscopes, (see my U. S. Patent No. 1,300,890 for navigational instrument, dated April 15, 1919). This constant relative movement of the compass card and lubber ring is termed "the hunt" or "hunting". In transmitting the readings of the master compass to the repeater compasses or other controlled instruments located in other parts of the ship, which comprises transmitting the relative positions and movements of the compass card and lubber ring of the master to the corresponding elements of each repeating instrument, the follow-up element is caused to actuate a transmitter. In order that this transmitter shall offer as little resistance as possible to the said reversing motor it is preferably of light construction and consequently not capable of caring for sufficiently strong current to control a large number of repeater instruments or repeater instruments of relatively large load characteristics. Furthermore, it is sometimes undesirable to transmit the hunting movement of the master.

The principal objects of the present invention then are to provide a device for effecting a repetition of the relative movements of certain parts of an instrument in a large number of controlled instruments, and more specifically, a device for transmitting the relative movements of the compass card and lubber ring of a master compass to numerous repeater compasses and other controlled instruments and which device is capable also of eliminating from the movements transmitted, the hunting movements.

Other objects of the invention will appear in the description which follows.

Referring to the drawings wherein I have shown what I now consider the preferred form of my invention:

Fig. 1 is a side elevation partly in section of a gyroscope in connection with which my invention is adapted to be employed.

Fig. 2 is a side elevation of a relay transmitter device.

Fig. 2$^a$ is a detail thereof.

Fig. 3 is a wiring diagram showing a plurality of instruments or devices controlled through the relay transmitter.

Fig. 4 is a plan view of a modified form of relay transmitter device.

Fig. 5 is a detail taken on line 5—5 of Fig. 4 showing reversing contacts.

Fig. 6 is a view of the opposite side of the contact carrying block, showing collector rings and brushes for conducting current to said reversing contacts.

Fig. 7 is a sectional detail of means for adjusting the relative positions of the contacts of the transmitter.

Fig. 8 is a further detail of said adjusting means taken on line 8—8 of Fig. 7.

Fig. 9 is a diagrammatic view of contact make and break means.

In Fig. 1 I have shown a gyroscopic compass, wherein the frame or spider 1 is supported by the usual gimbal rings 2, 3. Rotatably depending from said spider on ball bearings 4 is shown what may be termed a follow-up element 5. Positioned within said element is a ring 6. This ring may be carried by said element by being attached thereto by a ball bearing connection 6' at its lower end, and by a torsion suspension wire 7 at its upper end. Ring 6 carries a casing 8 on horizontal bearings 9. The compass gyroscope is mounted within this casing with its spinning axis at 10. The ring 6 may carry a contact trolley 11 engaging electric contacts 12 carried by the follow-up element 5, as is usual in gyro compasses (see my U. S. Patent 1,279,471 dated November 17, 1918).

The directive force of the gyroscope causes relative movement of ring 6 and element 5 on axis 6'—7. This in turn causes relative movement of trolley 11 and contacts 12. The construction and function of these contacts being so well known and forming no part of this invention will not be dealt with in detail here. It is understood that movement of ring 6 will so position trolley 11 with respect to contacts 12 as to cause energization of motor 13 in one direction or the other depending upon the direction of movement of ring 6. Said motor will through pinion 14 carried thereby meshing with gear 15 carried by element 5 by means of bracket 17 cause rotation of said element in the same direction as ring 6 until the normal relative position of trolley 11 and contacts 12 is restored. In this manner element 5 follows all movements of ring 6.

A compass card 18 is secured by arms 19 to bracket 17 and is thus carried by the follow-up element. Positioned adjacent the compass card and readable in connection therewith is the lubber ring 20 attached to spider 1. Meshing with gear 16 is a pinion 21 on the shaft 22 of a transmitter 23. This transmitter may be of any suitable type, and is shown here as comprising a drum having alternate contacts 24 and insulation 25, arranged in stepped relation as shown, and engaged by brushes 26 so that as the drum rotates the brushes will successively engage their respective contacts 24. The transmitter is preferably of very light construction with the brushes 26 pressing lightly against their contacts, so that the resistance offered to motor 13 will be negligible. The motor may thus be very light so as to be able to quickly overcome its own inertia and thereby yield with a high degree of sensitiveness to reversing polarities.

Transmitter 23 is diagrammatically shown in Fig. 3 wherein 27 is a source of energy and 28 a repeater motor. It will be seen that operation of the transmitter will effect the energization and deenergization of the field windings 29 of said repeater motor in rotation so that the armature 30 will be caused to rotate. The shaft 31 of said armature may be used directly to actuate light repeater instruments or to open and close contacts to control the operation of larger devices. But, as we have seen, the current through the transmitter is weak and repeater motor 28 is, therefore, not capable of doing much work. Also, as previously stated, it is customary in master gyro compasses to maintain a constant relative movement of certain parts to keep the bearings free from static friction. This results in a relative movement of the indicating elements and consequently a continuously reversing or back and forth movement of the armature 30 of repeater motor 28. In order to overcome this weakness and to eliminate the back and forth or hunting movement from all repeater instruments I may employ a special form of relay transmitter. One form of such a device is shown in Fig. 2. In this view the shaft 31 of motor 28 is shown as carrying a drum 32 provided with electrical contact surfaces 33, 34 engaged by a roller or other suitable contact 35. Collector rings 36 are also carried by shaft 31 for engagement by brushes, not shown, to carry current to the said contacts. The said shaft also carries an elongated pinion 37 and rotatably bears in the enlarged end 38 of a second shaft 39. Said shaft 39 is provided with the contact drum 40 of a transmitter 41 which may be similar to transmitter 23 excepting that it is larger for the accommodation of heavier currents. A gear 42 is provided on shaft 39 meshing with a pinion 43 on the shaft of a motor 44. An irregularly shaped frame 45 is fixed to the enlarged end 38 of shaft 39 and bears rotatably at 46 on shaft 31. A small shaft 47 having a bearing at 48 in frame 45 and threaded engagement therewith at 49 is provided with a gear 50 meshing with pinion 37. An extending portion 51 of frame 45 may be provided with brackets 52, 53 resilient in the longitudinal direction of shaft 31 carrying at their outer ends a cross bar 54. This bar in turn carries the aforementioned trolley contact 35, and is provided with projections 55 straddling one end of a bell crank lever 56 pivoted at 57 to frame 45. The outer end of this bell crank lever is attached to a link 58 extending in the direction of extension 51. A bent lever 59 (see also Fig. 2ª) pivotally mounted at 60 on brackets 61 carried by extension 51 and provided with teeth 62 is attached to link 58 at 63. A mutilated pinion 64 fixed on shaft 47 meshes with said teeth 62.

The operation is as follows. Trolley 35 normally rests on insulating sapcer 65 so that no current passes through motor 44, but when repeater motor 28 turns, one or the other of contacts 33, 34 will pass into contact with said trolley. The width of strip 65, however, is preferably such that the aforesaid hunting movement transmitted to motor 28 will not move strip 65 out from under trolley 35 so that no movement of motor 44 will take place. Relative movement of the compass card 18 and lubber ring 20 in excess of the hunt will cause additional movement of motor 28 and thus effect closure of contacts 33—35 or 34—35. Motor 44 will then be actuated to turn shaft 39 in the same direction as shaft 31 of the repeater motor to actuate transmitter 41 to transmit movements of the compass card other than the hunt. Transmitter 41 may then control a plurality of repeater motors 67, 68, 69. Motors 68 and 69 are shown as geared directly to repeater compass cards 70 and 71 by means of pinion 72 on shaft 73 of the motor meshing with gear 74 attached to the card. Motor 67 may be employed to control the positioning of the rudder 75 of a ship by having on its shaft 76 a pair of reversing contacts 77, 78 connected by conductors 79, 80 to one side of oppositely wound coils 81, 82 of motor 83; the other side of said coils being connected by conductor 84 through source 85 to a trolley 86 resting normally on insulation 87 between contacts 77, 78. Movement in a given direction of repeater motor 67 then will close the circuit through one of coils 81—82 and cause rotation of motor 83 in a corresponding direction, while said motor will through suitable connection, such as chains 88, actuate the rudder.

The rotation of shaft 39 will carry frame 45 with it and thus carry trolley 35 back upon insulation 65 so that whenever drum 32 stops turning, trolley 35 will, as soon as it reaches insulation 65, also stop by reason of the deenergization of motor 44.

If at any time the speed of drum 32 becomes such that it is apt to move too far ahead of trolley 35 and thus become out of step with the trolley, pinion 37 will rotate gear 50 and thus cause shaft 47 to rotate on its own axis. This will cause the mutilated pinion 64 to actuate lever 59, link 58, and bell crank lever 56 to move trolley 35 laterally on drum 32 away from line 66, so that however many turns the trolley may lag behind the drum, it will remain on the one contact and motor 44 will continue to turn in the one direction. As pinion 64 continues to rotate it will be carried by the longitudinal movement of shaft 47 through frame 45 beyond the teeth 62 before completing one full revolution. Shaft 39 will then continue to rotate in the one direction until it again approaches the proper phase with shaft 31, when shaft 47 will by rotation in the opposite direction carry pinion 64 back into engagement with teeth 62 to slide trolley 35 laterally into its normal position.

In Fig. 4 I have shown a modified form of relay transmitter. In this form the repeater motor 28 may be geared through pinion 89 and gear 90 to a shaft 91. Secured to said shaft but insulated therefrom by insulation 92 (see also Fig. 7) is a bracket 93, carrying a resilient arm 94 at the end of which is an electric contact 35ª. Aligned with shaft 91 is another shaft 95 carrying fixed thereon a disc 96 on one face of which are a pair of reversing contacts 33ª, 34ª insulated therefrom, while on the other side are a pair of collector rings 97, 98 also insulated therefrom. Each of said rings may be connected to one of said contacts by pins 99, 100 to supply current thereto; the rings in turn receiving current through brushes 101, 102. Contact 35ª may receive current through a brush 103 engaging bracket 93. Contact 35ª normally rests on a dead contact 65ª but upon slight relative rotation of shafts 91 and 95 slides into engagement with contact 33ª or 34ª.

Shaft 95 may be provided with a gear 104 meshing with a pinion 105 on a shaft 106 which in turn carries a gear 107 meshing with gear teeth 108 cut in shaft 109 of motor 44ª which is controlled in the same manner as motor 44 in Fig. 2. In this connection it is to be noted that the wiring diagram in Fig. 3 serves as well for the device shown in Fig. 4 as for that shown in Fig. 2 and that the elements 33, 34, 35, 65, 44, and 41 of Figs. 2 and 3 correspond with elements 33ª, 34ª, 35ª, 65ª, 44ª, and 41ª of Figs. 4, 5, and 7.

Mounted on the shaft 106 are cams 110, 111, 112 of transmitter 41ª. These cams are positioned 30° apart and alternately open the normally closed contacts 113, (see also Fig. 9) in the well known manner.

The operation of this form of relay transmitter is as follows: When repeater motor 28 is actuated through transmitter 23 as hereinbefore pointed out, it will actuate contact 35ª and cause the same to move back and forth across dead contact 65ª. So much of this movement as represents the oscillatory or hunting movement of the compass may take place without moving contact 65ª far enough to engage either of contacts 33ª, 34ª, but any additional movement will cause engagement of one of said other contacts and effect the actuation of motor 44ª. Rotation of this motor will actuate transmitter 41ª and at the same time rotate shaft 95 and disc 96 to restore contacts 33ª, 34ª to their normal position relative to contact 35ª.

In order to vary the amplitude of oscillation of contact 35ª required to effect engagement thereof with contacts 33ª, 34ª, said contact 35ª may be moved toward or away from its axis of rotation, or in other words, it may be moved toward the wider or narrower end of dead contact 65ª. This will necessitate a greater or less angular movement of contact 35ª to effect such aforesaid engagement. For this purpose arm 94 is positioned at its inner end between guides 114 (Figs. 4, 5, 7, and 8) on bracket 93, and may be provided with a slot 115 through which an eccentrically mounted pin 116 carried by a knob 117 rotatably mounted in bracket 93 projects. Rotation of said knob will obviously cause arm 93 to move in either of the directions indicated by double arrow 118, Figs. 5 and 8. A weight 119 may be carried by bracket 93 to counterbalance the knob 117.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. For instance by means of the invention outlined herein, it is possible to actuate repeating devices from a master compass, utilizing a transmitter requiring much more torque than the transmitter on the master compass, but nevertheless, none of this torque will be borne by the follow-up system of the gyro compass.

Having described my invention what I claim and desire to secure by Letters Patent is:

1. The combination with a gyro compass, of a transmitter driven thereby, a repeater motor in circuit with said transmitter, a plurality of electric contacts relatively positioned by said motor, a reversible motor actuated by said contacts, means controlled by said reversible motor for positioning said contacts in predetermined relationship, and a transmitter requiring more power to actuate the same than said first mentioned transmitter, also actuated by said reversible motor.

2. The combination with a compass subject to continuous oscillations and a transmitter driven thereby, of a repeater motor in circuit with said transmitter, a plurality of electric contacts relatively positioned by said motor, a reversible motor actuated by movements of said contacts beyond a predetermined amount, means controlled by said reversible motor for positioning said contacts in predetermined relationship, and a transmitter actuated by said motor.

3. In combination, a motor, a plurality of contacts relatively positioned by said motor, a second motor controlled by the position of said contacts, means actuated by said second motor for placing said contacts in normal relationship, and means controlled by the relative speeds of said motors for preventing said second motor from placing said contacts in said normal relationship.

4. The combination with a sending instrument subject to continuous small amplitude oscillation, of a relay transmitting device comprising a repeater motor adapted to be driven from said instrument, a pair of relatively movable contact elements comprising a pair of spaced reversing contacts and a cooperating contact, one of said elements being actuated by said repeater motor, a power motor controlled by said contacts and another of said elements being driven by said power motor, the spacing of said contacts being such as to reduce or eliminate the oscillations of the power motor.

5. The combination with a sending instrument subject to continuous small amplitude oscillation, of a relay transmitting device comprising a repeater motor adapted to be driven from said instrument, a pair of relatively movable contact elements comprising a pair of spaced reversing contacts and a cooperating contact, one of said elements being actuated by said repeater motor, a power motor controlled by said contact, another of said elements being driven by said power motor, the spacing of said contacts being such as to reduce or eliminate the oscillations of the power motor, and an electric transmitter actuated by said power motor.

6. In an electrical follow-up system, a source of primary movements, a servo motor, a two part commutating device comprising a rotary contact drum and a trolley or brush mounted to revolve about the axis of rotation of the drum, one of said parts being connected to said source while the other is connected to said servo motor, circuit connections between said motor and said device, and means adapted to move one of said parts axially upon falling out of step.

7. In an electrical follow-up system, a two part commutating device, one part receiving the primary impulses, while the other receives the follow-up impulses, both parts being adapted to rotate normally in unison, and means to cause relative axial movement of said parts on said parts becoming more than a predetermined angle apart.

8. In an electrical follow-up system, a source of primary movements, a servo motor, a two part commutating device comprising a rotary contact drum two conducting strips on said drum, a Z shaped insulating space between said strips, the middle portion of said space extending axially, and the other portions extending circumferentially, and a trolley or brush mounted to revolve about the axis of rotation of the drum, and to rest normally on said middle space, one of said parts being connected to said source, while the other is connected to said servo motor, circuit connections between said motor and said device and means adapted to move one of said parts axially upon the angle between said parts exceeding a predetermined amount.

9. In an electrical follow-up system, a source of primary movements, a servo motor, a two part commutating device, one part being connected to said source while the other is connected to said servo motor, both parts being adapted to rotate normally in unison, and means to cause relative axial movement of said parts upon the angle between said parts exceeding a predetermined amount, comprising a threaded rod adapted to be rotated only when said parts fall out of step, mechanism connecting said rod and one of said parts whereby said part is moved axially upon an initial rotation of said rod, said mechanism being rendered inoperative upon further rotation of said rod by the longitudinal feeding of said threaded rod.

10. In an electrical follow-up system, a source of primary movements, a servo motor, a two part commutating device, one part being connected to said source while the other is connected to said servo motor, both parts being adapted to rotate normally in unison, and means to cause relative axial movement of said parts upon the angle between said parts exceeding a predetermined amount, comprising a rod adapted to be rotated only when said parts fall out of step, and mechanism connecting said rod and one of said parts whereby said part is moved axially upon an initial rotation of said rod.

11. In a repeater system, a rotary commutator, a rotary follow-up contact device for said commutator, said commutator being divided into a plurality of sections by a circumferential band of insulation, which has at at least one point a substantially axially extending portion, and means to move said commutator and contactor axially an amount sufficient for said contactor to be placed to one side of said axially extending portion before said commutator and device complete a relative revolution.

12. In a repeater system, a rotary commutator, a rotary follow-up contact device for said commutator, said commutator being divided into a plurality of sections by a circumferential band of insulation, which has at at least one point a substantially axially extending portion, and means to move said commutator and contactor axially an amount sufficient for said contactor to be placed to one side of said axially extending portion before said commutator and device complete a relative revolution, and means for causing further axial movement of said parts on further relative rotation.

13. In combination, a compass including a compass card and a reference member, means for causing relative rotation of said card and member, a transmitter controlled by relative movements of said card and member, a motor controlled by said transmitter, a second motor controlled by said first motor through a lost motion device and a transmitter actuated by said second motor for controlling repeater devices.

14. In a gyroscopic compass, the combination with the compass and a plurality of devices for repeating the readings thereof, of means for actuating said repeating devices comprising a single transmitter of limited capacity and driven by said compass, a repeater motor adapted to be controlled by said transmitter, a second motor, a two part electrical controller, one part being positioned by said repeater motor and the other part by said second motor, said second motor being actuated by said controller, and a transmitter requiring more power to actuate than said first transmitter and driven by said motor adapted to actuate repeating devices.

15. In a repeater system for gyro compasses, the combination with the master compass and a transmitter actuated thereby, of a relay transmitter controlled therefrom and adapted to actuate repeater devices comprising a repeater motor actuated from said transmitter, a controller operated thereby, a motor controlled by said controller, a follow-up connection between the motor and controller, and a transmitter of larger capacity than said first named transmitter driven by said motor for actuating said devices.

In testimony whereof I have affixed my signature.

ELMER A. SPERRY.